MEMORY USING CHARGE STORAGE DIODES
Filed March 5, 1964
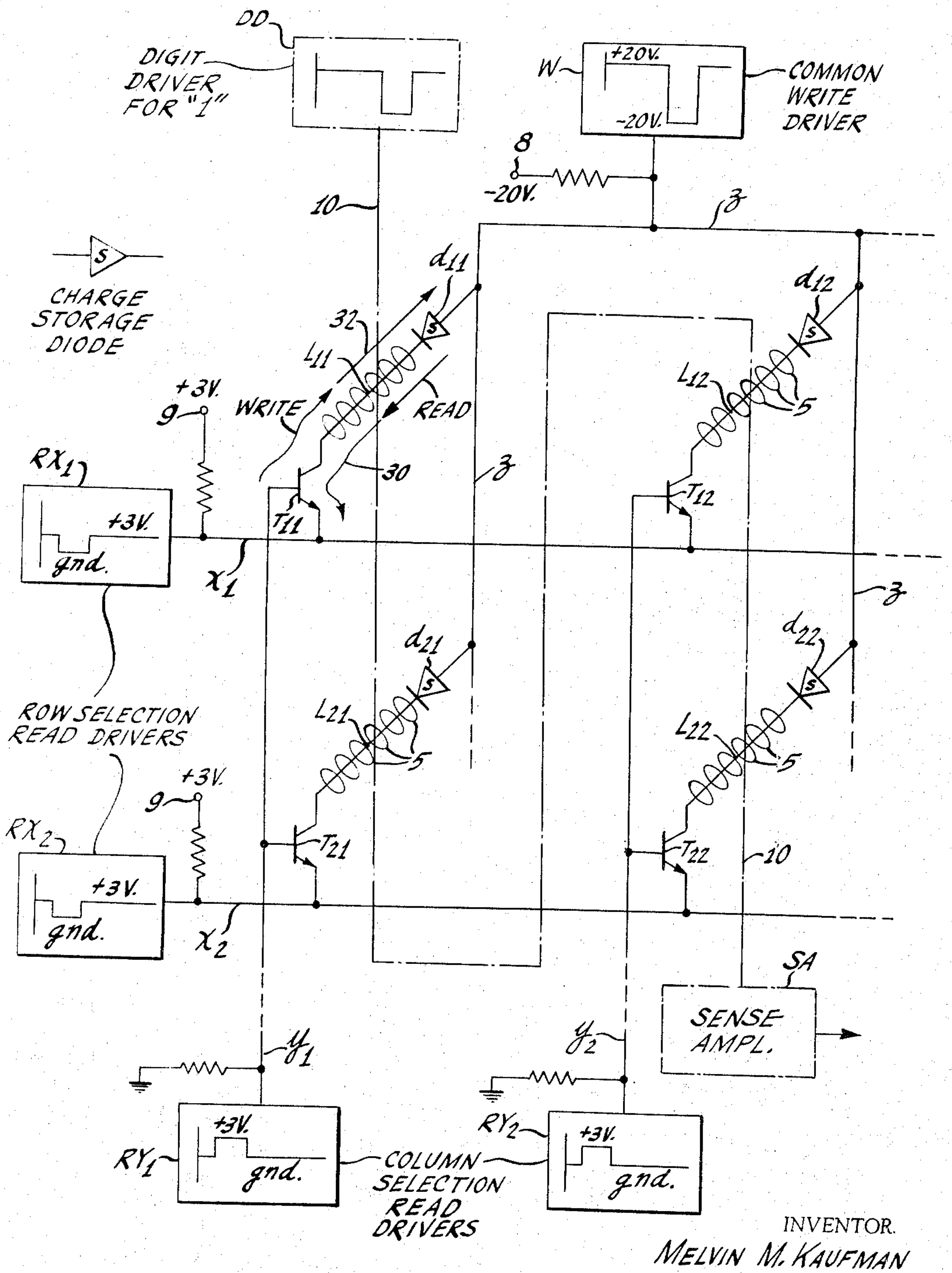
INVENTOR.
MELVIN M. KAUFMAN
BY
Carl V. Olson
Attorney 3,355,720

MEMORY USING CHARGE STORAGE DIODES

Melvin M. Kaufman, Levittown, N.J., assignor to Radio Corporation of America, a corporation of Delaware Filed Mar. 5, 1964, Ser. No. 349,715
5 Claims. (Cl. 340—173)

This invention relates to random-access magnetic memories for the storage of digital information, and particularly to means by which any word location may be accessed for the reading out of stored information and for the writing in of the same or new information.

In word-organized random-access memories a diode matrix is often used for the purpose of accessing any desired word in the memory. When the conventional diode matrix selection schemes are applied to memories of large size which are intended to operate at high speeds, it is found that the capacitances presented by all the word lines coupled to one row selection conductor, and all the word lines coupled to one column selection conductor are large. The resulting charging currents which flow upon energization of a selection conductor are correspondingly large and disturbing. Large current supplying capabilities are required of the selection drivers. The changing of the voltages on many nonselected word lines results in the capacitive coupling of large noise signals to the sense lines. The amplitudes of the noise signals coupled to the sense lines may be larger than the desired information signals when high speed operation is attempted.

It is a general object of this invention to provide an improved word selection scheme in which word selection voltages are isolated from all word lines except one selected word line.

It is another object to provide an improved memory in which the selection of one of many word lines can be accomplished at high operating speeds by economical selection means having relatively few components.

In accordance with an example of the invention, there is provided a plurality of word lines arranged in rows and columns. Each word line links a plurality of memory elements for the storage of an information word. Each word line is connected at one end through a charge storage diode to a common bus and is connected at the other end to the collector of a transistor. The emitter electrodes of the transistors associated with a row of word lines are connected to a respective row conductor. The base electrodes of transistors associated with a column of word lines are connected to a respective column selection conductor. Read pulse energization of one row selection conductor and one column selection conductor renders solely one transistor conductive to cause a read current through the associated word line and the associated charge storage diode. A write pulse is subsequently generated and applied over the common bus to the charge storage diodes of all word lines. The charge storage diode which was selected for reading is the only one having a charge stored therein; and therefore is the only one which presents a low impedance to the write pulse. The write pulse flows in the opposite direction through the word line to permit the writing of information.

The sole figure in the drawing shows an illustrative array of four word lines arranged in two rows and two columns, and shows means for selectively applying read and write pulses through any desired one of the word lines.

Referring now in greater detail to the drawing, four word lines $L_{11}$, $L_{12}$, $L_{21}$ and $L_{22}$ are arranged, for convenience of description, in an array of two rows and two columns. The arrangement shown is illustrative of the organization of a memory having a much greater number of word lines. Each word line is used for the storage of a number of information bits in the magnetic states of a corresponding plurality of memory elements such as the magnetic cores illustrated by the loops 5.

One end of each word line is connected through a respective charge storage diode $d_{11}$, $d_{12}$, $d_{21}$ and $d_{22}$ to a common bus $z$. The common bus $z$ is returned through an impedance to a bias source 8 which may have a value such as +20 volts. The common bus $z$ is also connected to a common write driver W. The other end of each word conductor is connected to the collector electrode of a respective one of the transistors $T_{11}$, $T_{12}$, $T_{21}$ and $T_{22}$. The emitter electrode of each transistor associated with a row of word lines is connected to a corresponding one of the row selection conductors $x_1$ and $x_2$. The row selection conductors $x_1$ and $x_2$ are each connected through a respective impedance to a bias terminal 9, which may provide a bias of +3 volts, and are each connected to a respective one of row selection read drivers $RX_1$ and $RX_2$.

The base electrodes of transistors associated with a column of word lines are connected to a respective one of column selection conductors $y_1$ and $y_2$. Each column selection conductor $y_1$ and $y_2$ is returned through an impedance to a source of potential which may be at ground reference potential, and is also connected to a respective column selection read driver $RY_1$ and $RY_2$.

The components thus far described permit the accessing of any one of the word lines for the reading and writing of information. The memory system also includes as many digit-sense conductors as there are memory storage elements 5 in each word line. One digit-sense conductor is represented by a phantom line 10 and is shown to link one of the memory elements 5 in each of the four word lines. The digit-sense line 10 may be coupled at one end to a digit driver DD and may be coupled at its other end to a sense amplifier SA. The other digit-sense lines (not shown) are similarly each coupled to a separate digit driver and a separate sense amplifier. Each of the drivers and the sense amplifiers are provided with a connection to a common return path which may be circuit ground as indicated in the drawing.

The charge storage diodes $d_{11}$, $d_{12}$, $d_{21}$ and $d_{22}$ are commercially available devices also referred to as "snap" diodes or "snap-off" diodes. A charge storage diode differs from a conventional semiconductor diode in that it has an intentional large charge storage characteristic. When a current pulse is applied through the charge storage diode in the forward direction, a charge remains stored in the diode after the termination of the pulse. The effect of the stored charge is to cause the diode to have a very low impedance in the back or reverse direction for a period of time corresponding with the time required to sweep the stored charge out of the diode.

In the operation of the memory system described, the destructive reading of a word of information stored along one of the word lines is accomplished prior to the writing of the same or different information into the word storage location along the same word line. One of the word lines is selected for reading by energizing one of the row selection read drivers $RX_1$, $RX_2$, and concurrently energizing one of the column selection read drivers $RY_1$, $RY_2$. Prior to energization of the read drivers, all of the transistors $T_{11}$, $T_{12}$, $T_{21}$ and $T_{22}$ are biased to be nonconducting. If the row selection read driver $RX_1$ is the one that is energized, it lowers the potential on the corresponding row selection conductor $x_1$ and increases the forward bias on the emitters of transistors $T_{11}$ and $T_{12}$. However, the change in potential on the emitters is not sufficient to permit conduction through the transistors. Concurrently, if the column selection read driver $RY_1$ is the one which is energized, it acts through column selection conductor $y_1$ to increase the forward bias on the bases of the transistor $T_{11}$ and $T_{21}$. This change in potential is in a direction tending to render the transistor $T_{11}$ and $T_{21}$ conductive, but solely the transistor $T_{11}$ is rendered conductive because the transistor $T_{11}$ is the only transistor having its emitter forward biased by the row selection read driver. When transistor $T_{11}$ is rendered conductive, a read current pulse flows through the charge storage diode $d_{11}$, the word line $L_{11}$ and the transistor $T_{11}$ in the path direction designated 30.

The read driver pulses applied to the row selection conductor $x_1$ and the column selection conductor $y_1$ results in a current flow through solely the word line $L_{11}$. There is no charging current supplied to the capacitance of word line $L_{12}$ or word line $L_{21}$ because the transistors $T_{12}$ and $T_{21}$ remain completely cut off. Since the word lines $L_{12}$ and $L_{21}$ are not changed in potential as a result of the half-select drive pulses applied to the transistors $T_{12}$ and $T_{21}$, there is no coupling of a noise signal from the word lines $L_{12}$ and $L_{21}$ to the digit-sense conductor 10 (and other digit-sense conductors not shown). For this reason, the coupling of noise to the digit-sense conductor is avoided.

When the row and column selection read drivers are energized in prior art systems, operated at very high speeds, there is a coupling of noise to the digit-sense conductors which is so high in amplitude as to mask the "1" and "0" information signals produced from the one selected word storage location. In the present arrangement, the reading of the information word along selected word line $L_{11}$ induces information sense signals on digit-sense lines 10 which are not masked by noise from word lines $L_{12}$ and $L_{21}$.

The reading of an information word from the word location of word line $L_{11}$ is closely followed by the writing of new or different information back into the same word location. The write current flows through the word line $L_{11}$ in the opposite direction designated 32. The current pulse in the direction 32 for the purpose of writing information is supplied under the control of the charge storage diode $d_{11}$. A charge was stored in the diode $d_{11}$ during the passage of the read current pulse through the diode in the direction 30. None of the other diodes $d_{12}$, $d_{21}$ and $d_{22}$ have a stored charge because they did not receive a read pulse.

The common write driver W applies a negative pulse through the common bus $z$ to the charge storage diodes at the ends of all word lines. Since the charge storage diode $d_{11}$ at the end of previously selected word line $L_{11}$ is the only charge storage diode containing a stored charge, the diode $d_{11}$ is the only diode affected by the write pulse. All the other charge storage diodes present a very high impedance to the flow of a write current pulse to the common bus $z$. The charge storage diode $d_{11}$ presents a low impedance to the flow of current in the write direction 32 only for so long as is necessary to sweep the charge out of the diode $d_{11}$. The write current flows from ground through column selection conductor $y_1$, the base-collector path in transistor $T_{11}$, the word line $L_{11}$, the storage diode $d_{11}$, and the common bus $z$ to the write driver W. The write pulse from the driver W is designed to have an amplitude and duration sufficiently great to sweep out the stored charge and thereby produce a write current pulse of desired amplitude and duration in the selected word line $L_{11}$. The write pulse is always desired to be smaller in amplitude than the read pulse which causes the storage of charge in the diode in the first instance.

The write pulse occurring upon the energization of the write driver W cooperates with the concurrent presence or absence of digit pulses from digit drivers of which one is illustrated at DD. A digit driver DD is energized concurrently with the write driver W when the writing of a "1" in the corresponding bit location in the selected word is desired. The absence of a digit pulse from the digit driver DD is used for the writing of a "0." In this case, the write pulse acting alone on a memory element in the selected word is of insufficient amplitude to significantly change the magnetic condition of the element.

After information has been read out of and written into a selected word line, any other word line may be selected for another read and write cycle of operation in the same manner as has been described. The reading of information from one selected word line can be accomplished at very high speeds in memories having a great number of word lines without the capacitive coupling of prohibitive amounts of noise through selection conductors and unselected word lines to the digit-sense lines and associated sense amplifiers.

What is claimed is:

1. In a memory array,
a plurality of word lines,
a common bus,
a plurality of charge storage diodes each connected from a first end of a respective one of said word lines to said common bus,
a plurality of transistors each having an output electrode connected to a second end of a respective one of said word lines, and having input electrodes,
read means connected to the input electrodes of said transistors to render solely one of said transistors conductive, whereby a read current pulse flows in one direction through the corresponding one of said word lines and the associated charge storage diode and stores a charge in said diode, and
a write driver connected through said common bus to all of said charge storage diodes to subsequently send an opposite-direction write current pulse through solely the diode having a stored charge and the associated word line.

2. In a memory array,
a plurality of word lines arranged in rows and columns,
a common bus,
a plurality of charge storage diodes each connected between a first end of a respective one of said word lines and said common bus,
a plurality of row selection conductors each corresponding with a respective row of word lines, and a plurality of column selection conductors each corresponding with a respective column of word lines,
a plurality of transistors each having an output electrode connected to a second end of a respective one of said word lines, and having input electrodes connected to respective corresponding row and column selection conductors,
read means to concurrently energize any one of said row selection conductors and any one of said column selection conductors to render solely one of said transistors conductive to send a read current pulse in one direction through the selected one of said word lines, and
a write driver connected through said common bus to all of said charge storage diodes to subsequently send a write current pulse through solely the previously selected one of said word lines.

3. In a memory array,
a plurality of word lines arranged in rows and columns, each of said word lines linking a plurality of memory elements for the storage of an information word,
a common bus,
a plurality of charge storage diodes each connected from a first end of a respective one of said word lines to said common bus,
a plurality of row selection conductors each corresponding with a respective row of word lines, and a plurality of column selection conductors each corresponding with a respective column of word lines,
a plurality of transistors each having an output electrode connected to a second end of a respective one of said word lines, having an input electrode connected to a corresponding row selection conductor and having another input electrode connected to a corresponding column selection conductor, means to concurrently energize any one of said row selection conductors and any one of said column selection conductors to render one of said transistors conductive to send a read current pulse in one direction through the corresponding one of said word lines and the associated charge storage diode, and a write driver connected to subsequently supply a pulse through said common bus to all of said charge storage diodes, whereby an opposite-direction write current pulse is sent through solely the previously-selected word line.

4. In a memory array, a plurality of word lines arranged in rows and columns, each of said word lines linking a plurality of memory elements for the storage of an information word, a common bus, a plurality of charge storage diodes each connected from a first end of a respective one of said word lines to said common bus, a plurality of row selection conductors each corresponding with a respective row of word lines, and a plurality of column selection conductors each corresponding with a respective column of word lines, a plurality of transistors each having a collector output electrode connected to a second end of a respective one of said word lines, having an emitter input electrode connected to a corresponding row selection conductor and having a base input electrode connected to a corresponding column selection conductor, read means to concurrently energize any one of said row selection conductors and any one of said column selection conductors to render one of said transistors conductive to send a read current pulse in one direction through the corresponding one of said word lines and the associated charge storage diode, whereby a charge is stored in said diode, and a write driver connected through said common bus to all of said charge storage diodes to subsequently send an opposite-direction write current pulse through solely the diode having a stored charge, the associated word line and the collector-base path of the associated transistor to the corresponding column selection conductor.

5. A memory array comprising a plurality of word lines arranged in rows and columns, each of said word lines linking a plurality of memory elements for the storage of an information word, a common bus, a plurality of charge storage diodes each connected from a first end of a respective one of said word lines to said common bus, a plurality of row selection conductors each corresponding with a respective row of word lines, and a plurality of column selection conductors each corresponding with a respective column of word lines, a plurality of transistors each having a collector output electrode connected to a second end of a respective one of said word lines, having an emitter input electrode connected to a corresponding row selection conductor and having a base input electrode connected to a corresponding column selection conductor, means to concurrently energize any one of said row selection conductors and any one of said column selection conductors to render one of said transistors conductive to send a read current pulse in one direction through the corresponding one of said word lines and the associated charge storage diode, whereby a charge is stored in said diode, a write driver connected through said common bus to all of said charge storage diodes to subsequently send an opposite-direction write current pulse through solely the diode having a stored charge, the associated word line and the collector-base path of the associated transistor to the corresponding column selection conductor, and a plurality of digit-sense line means each linking corresponding storage elements of all word lines.

No references cited.

TERRELL W. FEARS, *Primary Examiner.*